Oct. 23, 1962
C. E. HOHL
3,059,507
TOOL HOLDER
Filed April 30, 1959
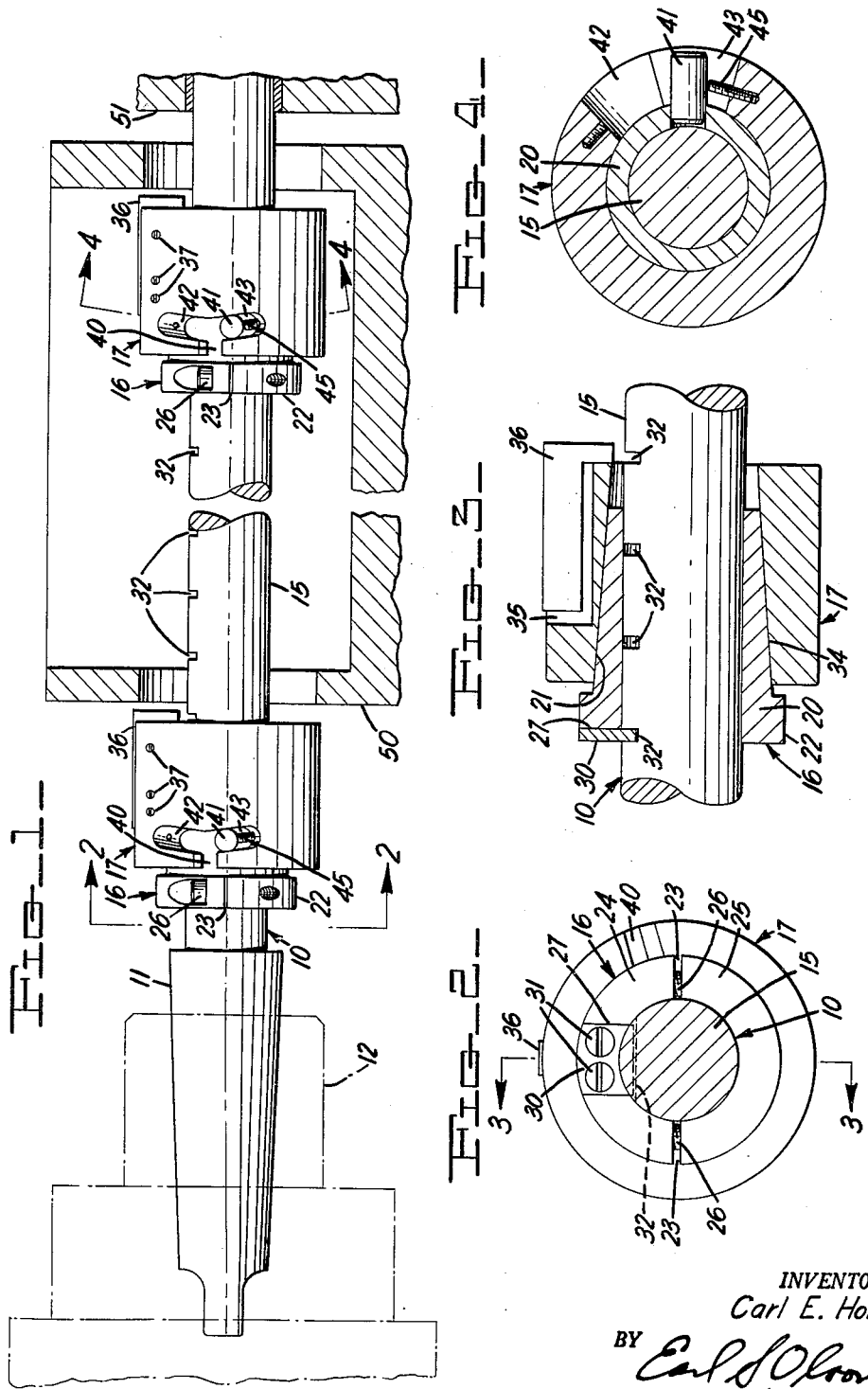
INVENTOR.
Carl E. Hohl
BY
ATTORNEY

United States Patent Office 3,059,507
Patented Oct. 23, 1962

3,059,507
TOOL HOLDER
Carl E. Hohl, Sinking Spring, Pa., assignor to Textile Machine Works, Wyomissing, Pa., a corporation of Pennsylvania
Filed Apr. 30, 1959, Ser. No. 810,078
1 Claim. (Cl. 77—56)

This invention relates to improvements in tool holders and more particularly to such tool holders of the type for use on boring machines and the like.

In boring machines of the type for line finishing spaced aligned holes in work pieces, a boring or tool holding bar is provided having one end secured in the spindle or turning head at one side of the work piece and the other or free end of the bar is supported for turning movement in a bearing member mounted in fixed position on the machine at the opposite side of the work piece. Usually the cutting tools or bits are carried in openings in the boring bars and the bits are held in fixed adjusted position therein by set screws. Where the holes to be bored are of different sizes and at opposite ends of the work piece, which would prevent the fixed tool bits from passing through certain of the holes when inserting the boring bar through the work piece, it has been the practice to first bore the hole or holes at one end of the work piece. Following the boring at the one end of the work piece, a different boring bar is commonly substituted in the driving head, if the size of the openings are different, and the position of the work piece is reversed to finish the holes at the other end of the work piece. In instances where an inner hole to be bored is larger than those at either end of the work piece, the tool bit must be inserted and secured in the boring bar after it has been passed through the work piece and this tool bit must again be removed before the boring bar is withdrawn from the work piece. The above procedures are both time and energy consuming and result in high manufacturing costs.

It has also been the practice in following the above procedures to place the bits in the boring bar adjacent to the openings to be bored in order to eliminate excessive movement of the boring bar relative to the work piece. This very often necessitates the repositioning of the tool bit openings for each different work piece to be finished and when these openings become too numerous or too closely spaced, the structure of the boring bar is weakened and sometimes breaks. Consequently, in order to avoid such weakened condition, a single boring bar may be limited to the finishing of only a small number of work pieces thereby necessitating the stocking of an excessive number of boring bars each having only a limited use.

It is an object of the invention to provide a boring bar for boring machines with means for mounting the cutting tools on the bar in a manner to overcome the above mentioned and other difficulties heretofore encountered in the use of such boring bars.

Another object of the invention is the provision of means on a boring bar for mounting the cutting tool and means for releasably securing the mounting means on the boring bar.

Still another object of the invention is the provision of means for releasably mounting a tool holder in working position on the boring bar which means includes an adapter member having means for holding it in fixed position on the boring bar and said adapted member also having means for releasably engaging the tool whereby the tool holder may be locked in working position on the adapter or removed therefrom.

A further object of the invention is the provision of means for mounting a tool holder in working position on the boring bar, the mounting means including an adapter member having means for engaging the tool holder to releasably hold it in working position thereon and the mounting means further including cooperating means on the boring bar and adapter member whereby the adapter member may be moved to and secured in different adjusted positions lengthwise of the boring bar.

With these and other objects in view which will become apparent from the following detailed description of the illustrative embodiment of the invention shown in the accompanying drawings, the invention resides in the novel elements, features of construction and cooperation of parts, as hereinafter more particularly pointed out in the claim.

In the drawings:

FIGURE 1 is an elevational view of a boring bar having means for releasably mounting cutting tools in accordance with the invention, the cutting tools being positioned on the boring bar adjacent to portions of a work piece on which the tools are adapted to operate;

FIG. 2 is a cross-sectional view on an enlarged scale taken along the line 2—2 of FIG. 1;

FIG. 3 is a cross-sectional view taken along the line 3—3 of FIG. 2; and

FIG. 4 is a cross-sectional view on an enlarged scale taken substantially along the line 4—4 of FIG. 1.

Referring to FIG. 1 of the drawings there is shown a boring bar or arbor 10 for use in horizontal boring machines and the like, the arbor having a tapered end portion 11 for interfitting in a turning head 12, indicated in dot-and-dash outline, of the machine. The arbor 10 has a portion 15 for mounting one or more adapter members 16 for mounting tool holders 17 in a manner hereinafter set forth. In the instant arrangement two adapted members 16 and tool holders 17 are shown and both being identical only one will be described in detail herein.

The adapter member 16 is in the form of a sleeve 20 having an inner bore interfitting the portion 15 of the arbor 10. The sleeve 20 has a tapered portion 21 and an enlarged flange 22 (FIGS. 1 and 3), which is slotted as indicated at 23 in FIG. 2 to form separate flange portions 24 and 25. Headed screws 26 passing through the portion 24 and threadably carried in the portion 25 are adapted to draw the flange portions together to clamp the sleeve 20 to the portion 15. The portion 24 of the flange is provided with a groove 27 for a key 30 which is releasably secured in the groove by screws 31 (FIG. 2). The key 30 is adapted to interfit in any one of a series of spaced slots 32 formed in the portion 15 (FIGS. 1, 2 and 3) for purposes which will more fully appear hereinafter.

The tool holder 17 is provided with an internally tapered bore 34 interfitting the surface of the tapered portion 21 of the sleeve 20 and a slot 35 which is formed in the outer periphery of the tool holder lengthwise thereof (FIG. 3). The slot 35 is adapted to receive a cutting tool or bit 36, set screws 37 being provided in the tool holder 17 for holding the cutting tool in adjusted position in the slot, as indicated in FIG. 1. At its left end, the tool holder 17 is provided with an opening or slot 40 the parallel sides of which extend axially of the tool holder, as viewed in FIG. 1. The slot 40 is of a width to clear a pin 41 which is secured in and extends radially from the sleeve 20. Extending in opposite directions around the periphery of the tool holder 17 from the opening 40 and communicating therewith are camming slots 42 and 43. The slots 42 and 43 extend along diverging lines with respect to the opening 40 and are of a width to closely fit the pin 41. In order to mount the tool holder 17 in fixed operating position on the adapter member 16, it is moved axially of the adapter member to pass the pin 41 through the slot 40. The tool holder 17 is then rotated in one direction or the other relative to the adapter member 16 to engage the pin 41 with the walls of one or the other of the slots 42 or 43 to draw the tapered surfaces 21 and 34 of the adapter member and tool holder, respectively, into operating engagement with each other. It is to be understood that the direction of rotative movement of the tool holder 17 relative to the adapter member 16 to draw the holder and member together is opposite to the direction in which the turning head is rotated. To prevent further rotative turning movement between the adapter member and tool holder during operation of the arbor 10, which would tend to jam the pin against the camming slot and prevent free turning movement of the holder to release the pin from the slot, the pin is adapted to engage a set screw 45 adjustably carried in the end of the slot in which the pin 41 is engaged.

As will be seen in FIG. 1, an adapter member 16 and tool holder 17 is positioned adjacent to each of the end walls of a work piece indicated at 50 to finish bore an opening in each of the end walls. Prior to the boring of the work piece the arbor 10 is prepared by placing an adapter member 16 in position at the left end of the arbor and attaching the same thereto by inserting a key 30 in the appropriate slot 32 in the arbor and then securing the key to the adapter member by the screws 31. The screws 26 are then turned in to clamp the adapter member 16 to the arbor and a tool holder 17 is connected to the adapter member by engaging the pin 41 in one or the other of the slots 42 or 43, as hereinbefore set forth, the pin being engaged in the slot 43 in the instant arrangement. A second adapter member 16 is attached in a like manner in a position adjacent the right or free end of the arbor 10. With the arbor 10 inserted in the turning head 12, a work piece is suitably secured on the movable work table or carriage of the machine. The carriage is then idly advanced toward the arbor and after the right end of the arbor passes through the unfinished hole in the left wall of the work piece, the second tool holder 17 is placed on the right adapter member and attached thereto in the manner above set forth. Idle movement of the carriage is continued until the free end of the arbor enters a usual support bearing 51 secured to the carriage and the tool holders are in position adjacent the end walls of the work piece. The carriage is then operated to complete the boring operation after which it is idly moved away from the arbor to withdraw the work piece from the arbor. During this withdrawal of the work piece the right tool holder 17 is released from its adapter member and removed from the arbor. It is to be understood that where a number of the same work pieces are to be machined, the left tool holder remains attached to the arbor and only the right tool holder is attached to the arbor and removed therefrom during the boring operation on each work piece.

It is believed to be obvious from the foregoing that the boring bar or arbor of the instant invention provides for the ready attachment to and removal of a tool holder from the arbor from a position within the walls of a work piece to be machined. Also, the spaced slots in the arbor provide the means whereby the adapter members may be readily moved to and held in different positions along the arbor to thereby position the tool holders closely adjacent to the walls of the work piece to be machined. Further, while the slots are shown in certain spaced relation along only one side of the arbor it is to be understood that the slots may be spaced in closer relation or they may be arranged in different positions circumferentially of the arbor in order to increase the number of positions in which the adapter members may be held during the machining of different work pieces.

Of course, the improvement specifically shown and described by which the above results are obtained, can be changed and modified in various ways without departing from the invention herein disclosed and hereinafter claimed.

I claim:

An arbor for a boring machine having means for mounting a cutting tool in working position on said arbor, said mounting means including an adapter member, means for releasably connecting said adapter member to said arbor for rotation therewith, a holder for said cutting tool adapted to be mounted in working position on said adapter member, and means for releasably connecting said holder to said adapter member in said working position, said first mentioned releasably connecting means including a slot in said arbor, means carried on said adapter member for engagement in said slot, and means for clamping said adapter member to said arbor, and said second mentioned releasably connecting means comprising a canning slot in said holder and a pin carried by said adapter member for engagement in said canning slot.

References Cited in the file of this patent

UNITED STATES PATENTS

| 718,955 | Smith | Jan. 20, 1903 |
| 1,660,361 | Severson | Feb. 28, 1928 |
| 1,903,533 | Preston | Apr. 11, 1933 |

FOREIGN PATENTS

| 3,585 | Great Britain | 1909 |
| 407,257 | Italy | Sept. 26, 1944 |
| 1,009,668 | France | Mar. 12, 1912 |